United States Patent
Post, II

(10) Patent No.: US 7,085,641 B2
(45) Date of Patent: Aug. 1, 2006

(54) ACKERMAN ANGLE CORRECTION IN A STEERING SYSTEM FOR A LOW SPEED TURN

(75) Inventor: James W. Post, II, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 50 days.

(21) Appl. No.: 10/978,601

(22) Filed: Nov. 1, 2004

(65) Prior Publication Data

US 2006/0095188 A1    May 4, 2006

(51) Int. Cl.
*B62D 6/00*    (2006.01)

(52) U.S. Cl. .............. 701/70; 701/41; 180/443

(58) Field of Classification Search ........... 701/41, 701/42, 70; 180/443, 446
See application file for complete search history.

(56) References Cited

U.S. PATENT DOCUMENTS

| | | | |
|---|---|---|---|
| 5,765,118 A * | 6/1998 | Fukatani | 701/72 |
| 6,283,483 B1 | 9/2001 | Johnson et al. | |
| 6,301,534 B1 | 10/2001 | McDermott, Jr. | |
| 6,456,920 B1 * | 9/2002 | Nishio et al. | 701/70 |
| 6,568,697 B1 | 5/2003 | Brill et al. | |
| 6,591,937 B1 * | 7/2003 | Badenoch et al. | 180/446 |
| 6,650,980 B1 | 11/2003 | Ashrafi | |
| 6,816,799 B1 * | 11/2004 | Yu et al. | 702/94 |
| 6,834,543 B1 * | 12/2004 | Kin et al. | 73/146 |
| 6,895,318 B1 * | 5/2005 | Barton et al. | 701/42 |
| 6,904,349 B1 * | 6/2005 | Mori | 701/70 |

* cited by examiner

*Primary Examiner*—Gary Chin
(74) *Attorney, Agent, or Firm*—Rankin, Hill, Porter & Clark LLP

(57) ABSTRACT

A method of calculating feed-forward lateral acceleration of a moving vehicle is provided. The method includes the use of a corrected steering angle of the vehicle. The steering angle is corrected by using the Ackerman steer angle of the vehicle. Depending upon the speed at which the vehicle is traveling the steering angle may be corrected using the full Ackerman steer angle, a fraction of the Ackerman steer angle or not at all.

9 Claims, 3 Drawing Sheets

ACKERMAN ANGLE CORRECTION IN A STEERING SYSTEM FOR A LOW SPEED TURN

BACKGROUND OF THE INVENTION

1. Field of the Invention

This invention generally relates to methods for estimating a vehicle's feed-forward lateral acceleration and, more particularly, to methods using a measured parameter of the vehicle's steering system to refine a feed-forward lateral acceleration estimation technique.

2. Description of Related Art

A vehicle develops an acceleration component lateral to the longitudinal axis of the vehicle when the vehicle begins to turn. During these situations it is normal in vehicles that provide an adjustability feature, to adjust the torque distribution between the wheels (front-to-back, side-to-side, etc.) in order to allow for effective handling of the vehicle. Lateral acceleration is one factor that is used in calculations that control the torque distribution amongst the wheels.

To enhance control response, it is advantageous to estimate the lateral acceleration of the vehicle from specific driver inputs. An estimated lateral acceleration may be used in a feed-forward control system to adjust for a condition caused by turning the vehicle, in combination with changing vehicle speed or alone, prior to the turn having a major affect on the stability of the vehicle. This estimated lateral acceleration is known as feed-forward lateral acceleration.

With reference to FIG. 3, a known feed-forward lateral acceleration estimation method is schematically illustrated. In this known method, the measured vehicle speed 10 is input into a gain table 12 to arrive at a signal 14 that is lateral acceleration per degree of steering angle. In multiplier 17 the measured steering angle 16 is multiplied with the signal 14 to provide a lateral acceleration signal 18, which is then converted to a magnitude value (by taking the absolute value 20) and its output is limited by passing this result through a saturation table 22 (to ensure the calculated value does not rise above actual vehicle cornering limits) to derive a normalized lateral acceleration signal 24. In multiplier 29, the normalized lateral acceleration signal 24 is multiplied by the sign of the steering angle, 26, to arrive at the estimated feed-forward lateral acceleration signal 28, which is used to control the front-to-rear and/or side-to-side torque applied to the vehicle wheels.

Unfortunately, in situations of low vehicle speed and tight turning, the known method for estimating feed-forward lateral acceleration become less accurate. More specifically, the feed-forward lateral acceleration is overestimated. It is believed that this overestimation is primarily due to the fact that the high turning angle (steering angle) tends to dominate the calculation. As a result, in a drive torque system utilizing feed-forward control, high rates of activation or shifting of drive torque may be implemented when they are, in fact, not required. Therefore, there exists a need in the art to correct the measured steering angle to compensate the feed-forward estimate of the lateral acceleration in low speed, tight turning situations.

SUMMARY OF THE INVENTION

The present invention is directed toward a method and apparatus for compensating for overestimations to feed-forward lateral acceleration estimates at low speeds and tight turning radii.

In accordance with the present invention, a correction factor based on a known quantity in the state of the art of vehicle dynamics is used. In one embodiment of the invention a method is provided that measures the speed of the moving vehicle, measures the steering angle of the moving vehicle, calculates an Ackerman steer angle of the moving vehicle, corrects the steering angle using the Ackerman steer angle, and finally calculates the feed-forward lateral acceleration of the vehicle using the speed of the vehicle and the corrected steering angle.

In further accordance with the present invention, the measured vehicle steering angle is corrected by subtracting the calculated Ackerman steer angle, and the so-corrected or adjusted vehicle steering angle is used to estimate the feed-forward lateral acceleration.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

As used in this description and in the appended claims, the following terms will have the definitions indicated thereafter:

"feed-forward lateral acceleration" means a calculated estimation of a vehicle's actual lateral acceleration (excluding any delays associated with the natural build-up of lateral acceleration following a steering angle input);

"steering angle" means the angular displacement of the steering wheel itself by the driver; and "vehicle overall steering ratio" means the number of turns (rotations) of the steering wheel of the vehicle for one turn (rotation) of the vehicle road wheel about a vertical axis.

An improved method of calculating feed-forward lateral acceleration of a vehicle is provided. This improved method uses measurements of a vehicle speed and measurements of a vehicle steering angle, corrected using a calculated Ackerman steer angle, to calculate feed-forward lateral acceleration. The present invention provides an estimated feed-forward lateral acceleration that is more accurate, and minimizes or eliminates the problems of over-actuation from which the known methods suffer. Accordingly, the present invention, to be described hereafter in greater detail, provides greater accuracy, especially in situations when the vehicle is traveling at a low speed and making a tight turn.

Figure 2:
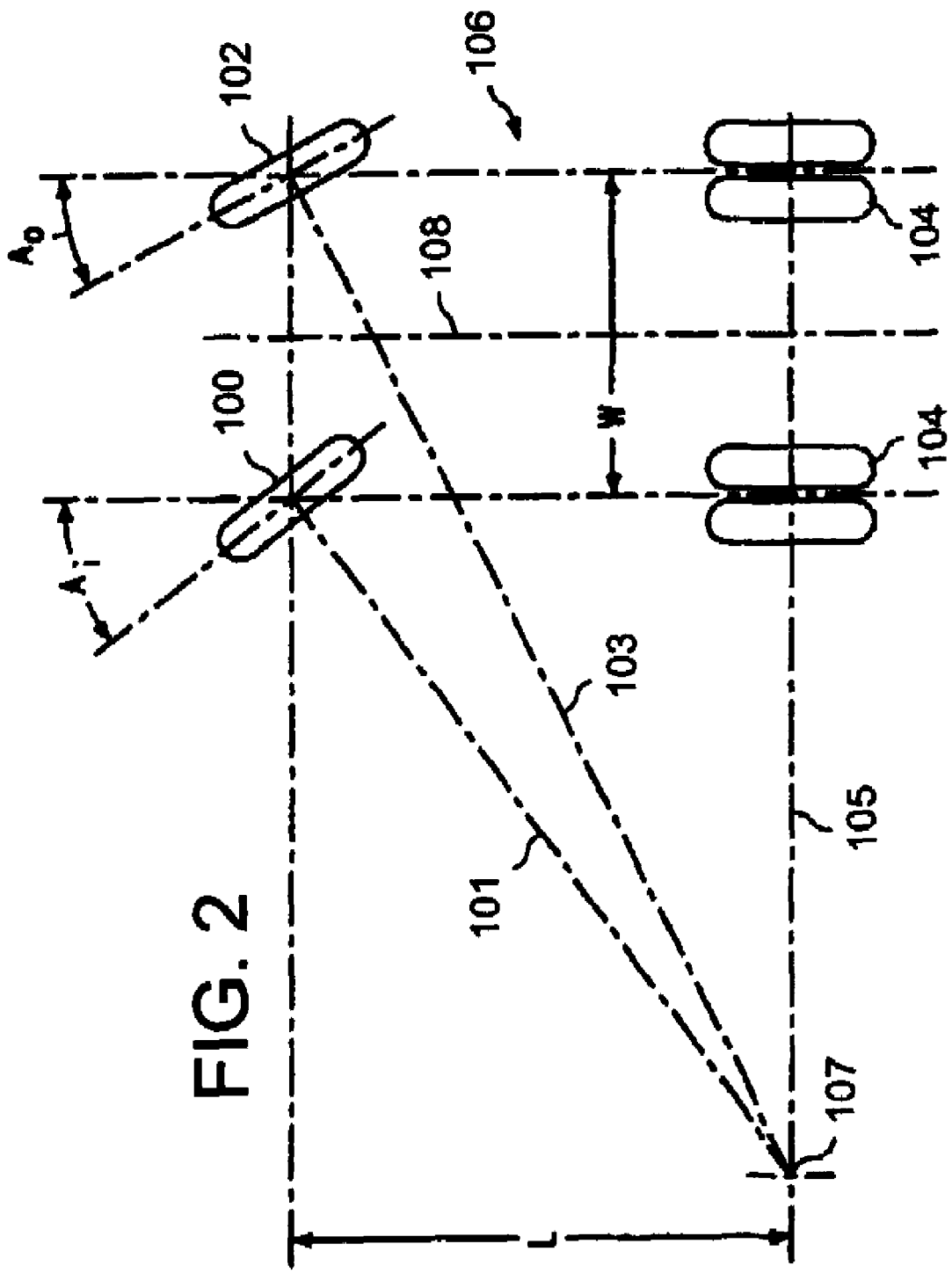
FIG. 2 is a schematic representation of the position of wheels on a vehicle during a turn; and, FIG. 3 schematically illustrates a conventional feed-forward lateral acceleration estimating technique.

Referring to FIG. 2, the wheels 100, 102, 104 of a vehicle 106 are illustrated in a turning orientation. The wheels include a front left wheel 100, a front right wheel 102, and a pair of rear wheels 104. As the vehicle 106 makes any type of turn, acceleration is created in a direction lateral to the vehicle's centerline 108. This component, called lateral acceleration, is estimated by the method of the present invention, described hereinafter, and is used as part of a feed-forward control system to adjust the front-to-rear and side-to-side drive torque distribution to the wheels 100, 102, 104 for greater stability. As previously stated, feed-forward lateral acceleration estimation may lose its accuracy in conditions of low vehicle speed and tight turning. The improved estimation method and system of the present invention employs a correction factor to maintain accuracy.

Figure 1:
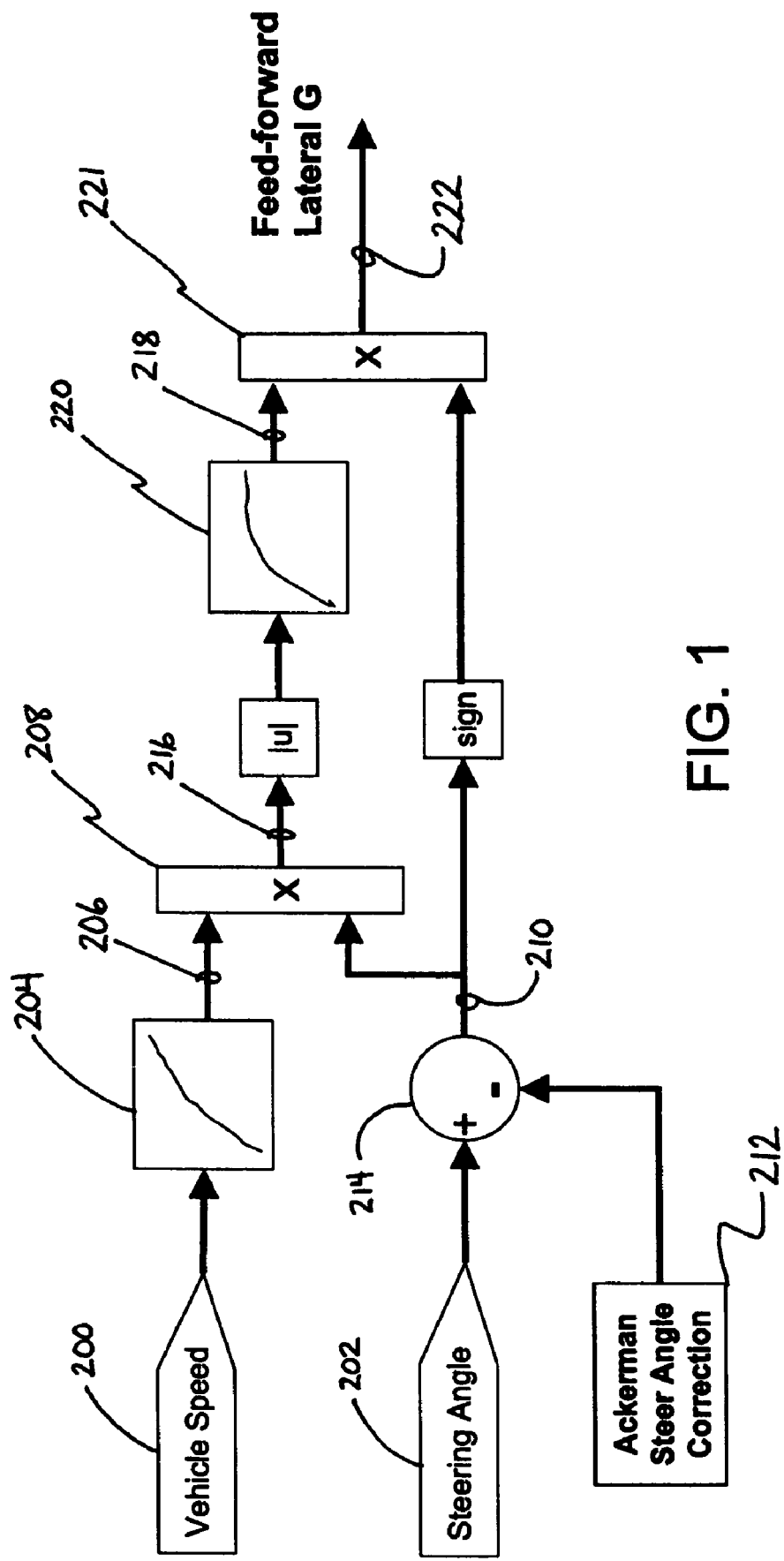
FIG. 1 schematically illustrates a feed-forward lateral acceleration calculation technique using an Ackerman steer angle correction according to the present invention.
Figure 3:
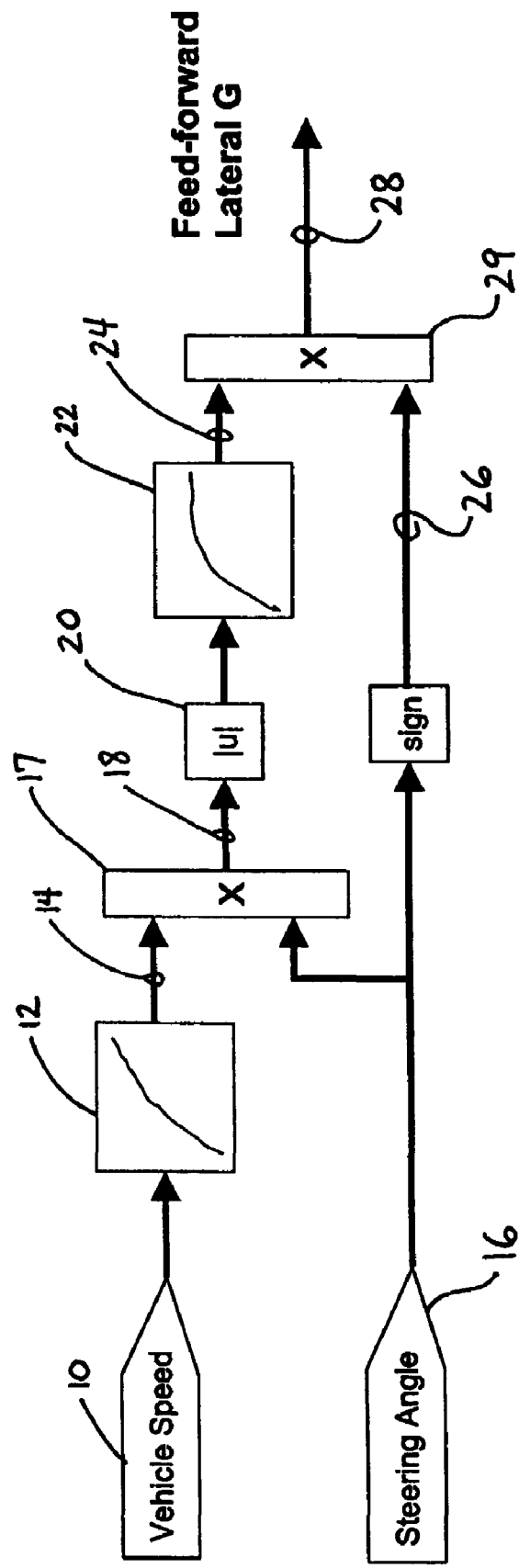

With reference to FIG. 1, the improved method of calculating or estimating feed-forward lateral acceleration is described. It is noted that although several of the components used in the improved method are identical to those used in the conventional method described hereinbefore with regard to FIG. 3, these components are described in more detail hereinafter and given different reference numerals.

Readings of vehicle speed 200 and vehicle steering angle 202 are made. These readings are made by one or more sensors, as is known in the art. The sensed vehicle speed is input into a lookup table referred to hereinafter as a lateral acceleration gain table 204. The lateral acceleration gain table includes values that are experimentally determined and serve to correlate input vehicle speed to lateral acceleration per steering angle degree. Therefore, the lateral acceleration gain table 204 serves to convert the measured vehicle speed into an anticipated or predicted lateral acceleration signal 206, which has units of: (lateral acceleration)/(steering angle).

The output 206 of the lateral acceleration gain table 204 is supplied to a multiplier 208, which also receives the corrected steering angle signal 210, described hereinafter.

The vehicles measured steering angle 202 is reduced by the Ackerman steer angle 212 to arrive at the corrected steering angle. Calculation of the Ackerman steer angle 212 is described in more detail below.

Preferably, the measured steering angle 202 is corrected by subtracting the Ackerman steer angle 212 from the measured value in a subtraction block 214 to provide the corrected steering angle 210. The corrected steering angle 210 is then multiplied by the predicted lateral acceleration gain signal 206 to provide a signal referred to hereinafter as the estimated lateral acceleration 216. The absolute value of the estimated lateral acceleration is modified into a normalized lateral acceleration signal 218 by using a saturation table 220.

The saturation table 220 contains values that are experimentally determined, and takes into account that the vehicle is not capable of generating lateral accelerations above a certain level due to natural tire adhesion limits. Therefore, the feed-forward lateral acceleration using the present method is reduced or limited so as not to produce lateral acceleration levels that are not physically possible from normal tire adhesion limits. Accordingly, the saturation table 220 includes a range of factors that vary based on the absolute value of the calculated lateral acceleration, 216, prohibiting it from achieving a level that is not possible based on tire lateral adhesion. Rather than a simple saturation function (which assumes a 1:1 correspondence of the output to the input up to the saturation limit value) a shaping saturation function is used to allow progressive growth of the input parameter (calculated lateral acceleration) up to a defined maximum value.

The normalized lateral acceleration 218 output by the saturation table 220 is multiplied in the multiplier 221 by the sign of the corrected steering angle 210 to provide feed-forward lateral acceleration 222. The feed-forward lateral acceleration 222 is used to adjust the front-to-back and/or side-to-side wheel torque distribution of the vehicle. Insofar as use of feed-forward lateral acceleration to adjust wheel torque distribution is known in the art, and is not part of the present invention, it will not be discussed further hereinafter.

With reference to FIG. 2, for correct Ackerman steering the steer angle $A_i$ of the inner wheel 100 is greater than the steer angle $A_o$ of the outer wheel 102, such that the axes 101, 103 of the inner and outer wheels intersects at a single point 107 on the projection 105 of the rear axle. Accordingly, the Ackerman steer angle may be thought of the difference between the inner wheel steering angle $A_i$ and the outer wheel steering angle $A_o$ necessary to make the aforementioned condition exist. Although the Ackerman steer angle is considered to be known in the art, it will be described hereinafter to assist understanding of the disclosure.

The Ackerman steer angle δ may be referred to as the front road wheel input required to steer a normally front steer vehicle around a tight turn at or near zero velocity. The Ackerman steer angle of the vehicle may simply be defined as the vehicle's wheelbase divided by the turning radius of the vehicle. The turning radius of the vehicle may be described by other vehicle characteristics as follows:

$$R = V/\Psi$$

R=Vehicle turning radius
V=Vehicle speed
Ψ=Vehicle yaw rate

The yaw rate is estimated by known vehicle parameters in combination with other measured outputs of the vehicle, such as described below. Alternatively, the yaw rate may be measured by a yaw rate sensor. One way to estimate the yaw rate is as follows:

$$\Psi = \frac{2}{TR} \times (V_{OUT} - V_{IN})$$

Ψ=Vehicle Yaw Rate
$V_{OUT}$=Speed of outside wheel in a turn
$V_{IN}$=Speed of inside wheel in a turn
TR=Vehicle Track Width An estimate of the vehicle speed is the average of the speed of an inside wheel of the vehicle and an outside wheel of the vehicle, shown as follows:

$$V = \frac{1}{2} \times (V_{OUT} + V_{IN})$$

The equations are rewritten in combination to provide a calculation for the Ackerman steer angle:

$$\delta = \frac{2 \times L \times (V_{OUT} - V_{IN})}{TR \times (V_{OUT} + V_{IN})}$$

The equation for measuring the Ackerman steer angle may be scaled by the overall vehicle steer ratio thus allowing the Ackerman steer angle to be expressed in a manner that allows for direct correction of the measured steering angle:

$$\delta = \frac{2 \times L \times (V_{OUT} - V_{IN})}{TR \times (V_{OUT} + V_{IN})} \times SR$$

δ=Ackerman steer angle
$V_{OUT}$=Speed of outside wheel in a turn $V_{IN}$=Speed of inside wheel in a turn
TR=Vehicle Track Width
L=vehicle wheelbase
SR=Vehicle overall steering ratio In a preferred method of practicing the invention, a correction based on Ackerman steer angle 212 is limited with speed in order to mitigate any failure risk of certain sensors. Before applying the calculated Ackerman steer angle 212 to a correction of the measured steering angle 202, the Ackerman steer angle 212 is passed through a speed-based correction permission table. Since correction is only required at speeds below a certain level a diminishing correction effect with increasing speed is created to ensure system failsafe robustness. For speeds below a certain value (40 kph), the Ackerman steer angle 212 is multiplied by "1" and fully used in correction. Within a speed range of 40–50 kph, the multiplying factor is gradually decreased to "0", such that above 50 kph, the Ackerman steer angle 212 no longer takes effect.

The vehicle includes a number of sensors used to measure the parameters of the vehicle while in operation. A known speedometer is used to measure the overall speed of the vehicle. Velocity sensors that are part of known anti-lock braking systems (ABS) are used to measure individual wheel velocities. The vehicle's steering angle may be measured by a sensor in the steering column or by other known means.

Although the invention has been shown and described with reference to certain preferred and alternate embodiments, the invention is not limited to these specific embodiments. Minor variations and insubstantial differences in the various combinations of materials and methods of application may occur to those of ordinary skill in the art while remaining within the scope of the invention as claimed and equivalents.

What is claimed is:

1. A method of calculating a feed-forward lateral acceleration of a moving vehicle comprising the steps of:
    measuring a speed of the moving vehicle;
    measuring a steering angle of the moving vehicle;
    calculating an Ackerman steer angle of the moving vehicle;
    calculating a corrected steering angle of the moving vehicle using the Ackerman steer angle of the moving vehicle; and
    calculating the feed-forward lateral acceleration of the moving vehicle using the measured speed of the moving vehicle and the corrected steering angle.

2. The method of claim 1, wherein the corrected steering angle is calculated by subtracting the Ackerman steer angle from the measured steering angle.

3. The method of claim 1, wherein the step of calculating the Ackerman steer angle includes measuring or calculating a yaw rate of the vehicle.

4. The method of claim 1, wherein the step of calculating the Ackerman steer angle includes measuring the speed of an outside vehicle wheel in a turn and measuring the speed of an inside vehicle wheel in the turn.

5. The method of claim 1, further including a step of calculating drive torque for each wheel of the vehicle on the basis of the calculated feed-forward lateral acceleration of the vehicle.

6. The method of claim 1, wherein the Ackerman steer angle is scaled as the speed of the moving vehicle increases.

7. The method of claim 1, wherein the vehicle speed is used to look up a lateral acceleration predictor using a predetermined table specific to the vehicle.

8. The method of claim 2 wherein the corrected steering angle is multiplied by an estimated lateral acceleration of the vehicle.

9. A system of calculating feed-forward lateral acceleration of a moving vehicle comprising:
    means for measuring a speed of a moving vehicle;
    means for measuring a steering angle of the moving vehicle;
    means for calculating an Ackerman steer angle of the moving vehicle; and
    means for calculating the feed-forward lateral acceleration of the moving vehicle using the measured speed of the moving vehicle and a steering angle corrected by using the Ackerman steer angle.

* * * * *